US006681988B2

(12) United States Patent
Stack et al.

(10) Patent No.: US 6,681,988 B2
(45) Date of Patent: Jan. 27, 2004

(54) METHOD AND SYSTEM FOR MANAGING A TRANSACTION CARD ACCOUNT (75) Inventors: James Russell Stack, New York, NY (US); William A. Borden, South Orange, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/994,796

(22) Filed: Nov. 28, 2001

(65) Prior Publication Data

US 2002/0063153 A1 May 30, 2002

Related U.S. Application Data (60) Provisional application No. 60/253,569, filed on Nov. 28, 2000.

(51) Int. Cl.⁷ ................................................. G06K 5/00
(52) U.S. Cl. ....................................... 235/380; 235/380
(58) Field of Search .......................... 235/440, 380, 235/379

(56) References Cited

U.S. PATENT DOCUMENTS

| 5,220,501 A | * | 6/1993 | Lawlor et al. ............. 902/24 |
| 5,444,616 A | * | 8/1995 | Nair et al. ................ 235/440 |
| 5,448,047 A | * | 9/1995 | Nair et al. ................ 235/440 |
| 5,970,478 A | | 10/1999 | Walker et al. |
| 5,984,191 A | | 11/1999 | Chapin, Jr. |
| 6,032,134 A | | 2/2000 | Weissman |
| 6,032,136 A | | 2/2000 | Brake, Jr. et al. |
| 6,064,987 A | | 5/2000 | Walker et al. |

OTHER PUBLICATIONS

"Texaco Announces Revolving Credit Terms for Selected Card Holder," *PR Newswire*, 0202NY32, Feb. 2, 1988.

* cited by examiner

Primary Examiner—Harold I. Pitts
(74) Attorney, Agent, or Firm—George T. Marcou; Kilpatrick Stockton LLP (57) ABSTRACT A method and system for managing a transaction card account includes a dual function transaction card with primary and secondary transaction card functions that is issued to a cardmember in connection with the account. The cardmember is allowed to incur charges on the account with the dual function transaction card, and statements are periodically issued to the cardmember on the account for a balance payable that is based on the primary function of the transaction card. The cardmember is allowed to elect the secondary function of the dual function transaction card, and such an election is made, a new balance is computed on the account in response to the election and the cardmember is notified of the new balance and a new minimum due for the account.

79 Claims, 9 Drawing Sheets

METHOD AND SYSTEM FOR MANAGING A TRANSACTION CARD ACCOUNT

PRIORITY APPLICATION

This application claims the benefit of U.S. Provisional Application No. 60/253,569 filed Nov. 28, 2000, entitled "Method and System for Managing a Transaction Card Account (Charge/Revolve Flexibility)", which is incorporated herein by this reference.

FIELD OF THE INVENTION

The present invention relates generally to the field of financial transaction cards and more particularly to a method and system for managing a transaction card account.

BACKGROUND OF THE INVENTION

Currently, transaction cardholders or cardmembers throughout the world use transaction card accounts on a daily basis, and the use of the transaction card is a part of the typical cardmember's daily life. However, no one transaction card is right for every cardmember, and the core of the transaction card selection process is the cardmember's choice of a transaction card payment plan. Typically, a transaction card payment plan that is good for a cardmember who always pays the monthly bill in full is not necessarily good for a cardmember who does not pay off the balance each month. Further, a cardmember's circumstances with respect to paying the monthly bill may change over time. There is a present need for a transaction card account that enables, for example, the flexibility of a pay-in-full charge card which also offers revolving credit functionality or a revolving credit card that also offers pay-in-full charge card functionality.

SUMMARY OF THE INVENTION

It is a feature and advantage of the present invention to provide a method and system for managing a transaction card account that enables a dual function transaction card with the flexibility of revolving credit and pay-in-full transaction card functions.

It is another feature and advantage of the present invention to provide a method and system for managing a transaction card account that enables a transaction card that allows a cardmember to elect either a pay-in-full secondary function of the transaction card that has a revolving credit card primary function or a revolving credit card secondary function of the transaction card that has a pay-in-full charge card primary function.

To achieve the stated and other features, advantages and objects, the method and system of the present invention makes use, for example, of computer hardware and software in managing the dual function transaction card account. In an embodiment of the present invention, the dual function transaction card with primary and secondary transaction card functions is issued to a cardmember in connection with the account. In one aspect, the transaction card has a revolving credit card primary function and a pay-in-full charge card secondary function. In another aspect, the transaction card has a pay-in-full charge card primary function and a revolving credit card secondary function. The transaction card in the aspect with the revolving credit card primary function and the pay-in-full charge card secondary function allows the cardmember to revolve up to a predetermined credit limit balance and to pay in full a balance above the predetermined revolving credit limit balance and functions both as a pay-in-full charge card and a revolving credit card, if the cardmember chooses to pay a revolving credit card balance in full. The transaction card in the aspect with the pay-in-full charge card primary function and the revolving credit card secondary function allows the cardmember to revolve a portion of the pay-in-full charge card balance and functions both as a pay-in-full charge card and a revolving credit card, if the cardmember chooses to revolve any portion of the unpaid balance of the pay-in-full charge card balance.

The cardmember is allowed to incur charges on the account with the dual function transaction card, for example, for purchase transactions, as well as for cash advances. A charge incurred for a cash advance on the account for the dual function transaction card having the revolving credit card primary function and the pay-in-full charge card secondary function is treated as revolving credit with a finance charge assessed from the day of the advance until payment is received. A charge incurred for a cash advance on the account for the dual function transaction card having the pay-in-full charge card primary function and the revolving credit card secondary function is likewise treated as revolving credit with a finance charge assessed from the day of the advance until payment is received.

Periodically, a statement on the account is issued to the cardmember for a balance payable that is based on the primary function of the transaction card. The periodic statement based on the primary function of the transaction card as a revolving credit card informs the cardmember of a balance that can be revolved and a balance above a predefined revolving credit limit that must be paid in full, a minimum payment due and a revolving credit line amount, and provides the cardmember a predetermined number of grace days for payment of the statement. The periodic statement that is based on the primary function of the transaction card as a pay-in-full card informs the cardmember of a balance that is due in full; provides the cardmember a predetermined number of grace days for payment of the statement; provides a total balance including the charge and revolve functionality; and includes a minimum due for both of the following options: 1) the charge balance in full with a portion of the revolving balance; or 2) a portion of the total balance where the cardmember can elect to cause an unpaid portion of the charge balance to move into the revolve balance.

In an embodiment of the present invention, the cardmember is allowed to elect the secondary function of the dual function transaction card, which can be either the cardmember's election of the pay-in-full charge card secondary function of a dual function transaction card having a revolving credit transaction card primary function or the election of the revolving credit transaction card secondary function of the dual function transaction card having a pay-in-full transaction card primary function. The cardmember elects the pay-in-full charge card secondary function of the transaction card in the aspect with the revolving credit card primary function by exceeding a revolving credit line assigned to the transaction card account or by balance consolidating ("balconning") an amount that exceeds a revolving credit line assigned to the transaction card account. A cardmember who exceeds the revolving credit line assigned to the transaction card account is required to pay-in-full the balance by which the revolving credit line is exceeded and any charge by the cardmember that exceeds the revolving credit line assigned to the transaction card account is either 1) approved; 2) reviewed for approval and the cardmember may be called to the phone at point of sale (POS); or 3) the purchase may be declined; the decision depends upon the dollar amount of the purchase, the cardmember's credit history, the length of time the cardmember has been a cardmember, and other criteria as may be determined. The cardmember elects the revolving credit card secondary function of the transaction card in the aspect with the pay-in-full charge card primary function by choosing to make a partial payment of the pay-in-full balance due, by taking a cash advance, or by accepting a balance consolidation ("balcon") onto the transaction card account. Upon election of the revolving credit card secondary function, a maximum amount is established that the cardmember is allowed to revolve ("revolving credit limit"), and the transaction card is allowed to function as a revolving credit card for balances which the cardmember chooses to revolve.

A new balance is computed on the account in response to the election of the secondary function by the cardmember. For the election of the pay-in-full charge card secondary function of the transaction card in the aspect with the revolving credit card primary function, a new total balance is computed, which consists of at least a cardmember-chosen revolving balance and a full transaction balance incurred by the cardmember as a result of continued usage of the transaction card. Further, a total minimum due is computed, which consists of at least a minimum due for the revolving balance and the full amount of the transaction balance. For the election of the revolving credit card secondary function of the transaction card in the aspect with the pay-in-full charge card primary function, a new total balance is computed that consists of at least a cardmember-chosen revolving balance and a full transaction balance incurred by the cardmember as a result of continued usage of the transaction card. In addition, a first minimum due option is computed that consists of at least a minimum due for the revolving balance and the full amount of the transaction balance. A second minimum due option is also computed that consists of at least a minimum due for the revolving balance and a minimum due for the transaction balance.

A key aspect of the credit card account for an embodiment of the present invention is the dual charge and revolve functionality in which, for example, the dual function transaction card is issued to a cardmember with a charge bucket function and a revolve bucket function in connection with the account. The cardmember is allowed to incur charges on the account with the transaction card which fall into the charge bucket for which no interest accrues. Periodically, a statement is issued to the cardmember on the account for a balance payable on the charges in the charge bucket, and if the balance on the charges in the charge bucket is not fully paid, any remaining unpaid balance falls from the charge bucket into the revolve bucket on which interest accrues.

In this aspect, as mentioned, the cardmember is issued the dual function transaction card with the charge bucket function and the revolve bucket function and allowed to incur new charges on the account by making purchases with the transaction card in a billing cycle which new charges fall into the charge bucket on which no interest accrues. A statement is issued to the cardmember on the account for the current billing cycle at the end of the billing cycle for a balance payable on the charges in the charge bucket, which are allowed to remain in the charge bucket on which no interest accrues, and the cardmember is allowed to continue using the card for new purchases in a succeeding billing cycle which also fall into the charge bucket on which no interest accrues.

At the end of each billing cycle, the cardmember is allowed to elect either a first minimum due option of paying off the charges in the charge bucket in full or a second minimum due option of payment of a predetermined fraction of the entire balance of the charges in the charge bucket. If the cardmember pays off the charges in the charge bucket in full according to the first minimum due option, all current charges made by the cardmember are allowed to remain in the charge bucket, and all charges for new purchases made in a second succeeding billing cycle also fall into the charge bucket on which no interest accrues, as well. If the cardmember pays the predetermined fraction of the entire balance of the charges in the charge bucket according to the second minimum due option, all of the unpaid charges for purchases for the billing cycle fall into the revolve bucket on which interest accrues.

Other features in this aspect include, for example, allowing the cardmember to elect, upon issuance of the dual function transaction card, an option for balance consolidation in which charges for all new purchases fall into the charge bucket on which no interest accrues. Further, the dual function transaction card can be issued to the cardmember with the charge bucket function having an associated no preset spending limit feature and the revolve bucket function having an associated revolving credit line. It is to be noted that the cardmember is also allowed to incur new charges on the account by using the transaction card for a cash advance at an ATM which fall immediately into the revolving bucket and begin to accrue interest, while continuing to incur charges for new purchases that fall into the charge bucket on which no interest accrues.

Additional objects, advantages and novel features of the invention will be set forth in part in the description which follows, and in part will become more apparent to those skilled in the art upon examination of the following, or may be learned by practice of the invention.

DETAILED DESCRIPTION

Figure 1:
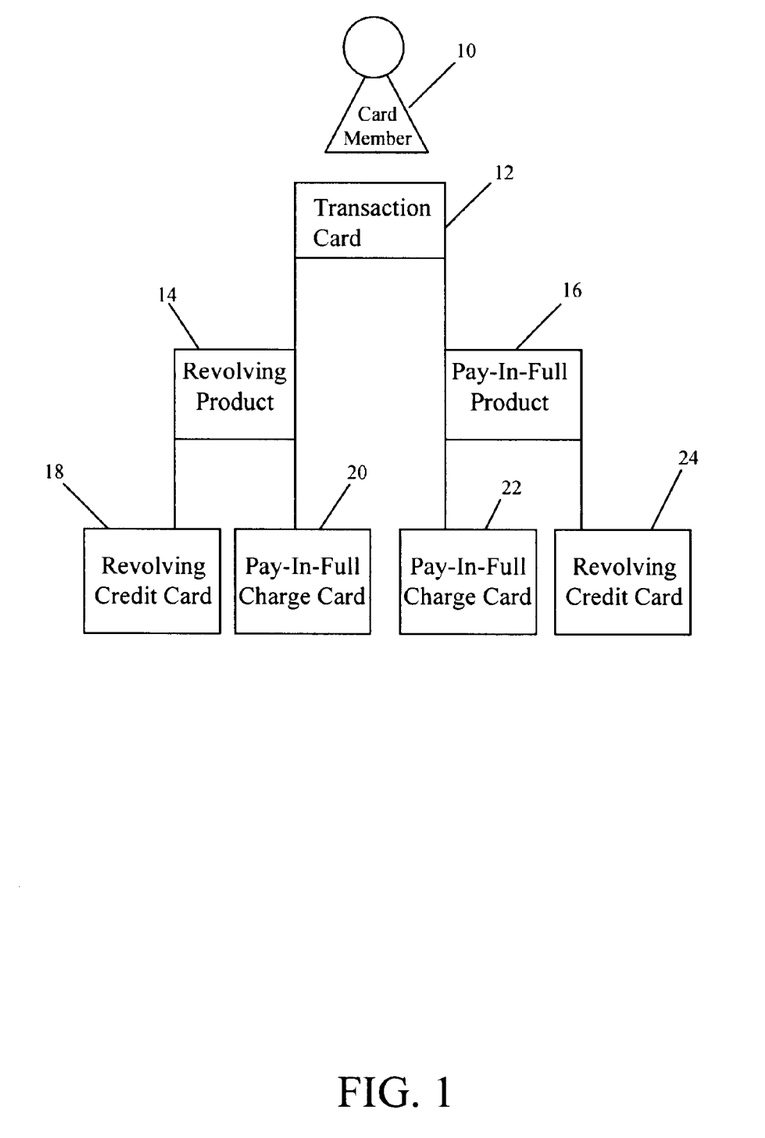
FIG. 1 is a chart which illustrates an example of variations of transaction cards enabled by the method and system for an embodiment of the present invention.

Referring now in detail to an embodiment of the invention, an example of which is illustrated in the accompanying drawings, the present invention enables a new family of no pre-set spending financial transaction cards and variations of card products within that family. FIG. 1 is a chart which illustrates an example of variations of transaction cards enabled by the method and system for an embodiment of the present invention. As shown in FIG. 1, one variation of card product 12 enabled by the present invention is a revolving product 14, which offers the flexibility of revolving a certain balance 18 and paying in full the balance 20 above the revolving credit limit. Another variation of card product 12 enabled by the present invention is a pay-in-full product 16, which is a charge card 22 offering the flexibility of revolving 24. This flexibility feature represents a niche between a true charge card and a true credit card. The transaction card 12 of the present invention allows an enrolled cardmember 10 to be flexible in how the cardmember 10 wishes to handle his or her credit by allowing the cardmember 10 the option of choosing when and how much he or she wants to revolve.

As illustrated in FIG. 1, in the revolving credit card aspect 14, the transaction card 12 has a dual function as a revolving credit card 18 and pay-in-full charge card 20. In this aspect 14, the transaction card 12 is issued and functions as a revolving credit card 18, for example, with a no preset spending limit. At the time the cardmember 10 chooses to pay in full, the transaction card 12 functions as both a charge card 20 and a credit card 18. The cardmember 10 transacts each month, and a monthly account statement is issued informing the cardmember 10 of the amount of the balance that can be revolved ("revolving credit limit") and the amount over and above the revolving credit limit that must be paid in full. The monthly account statement includes, for example, an annual percentage rate (APR) of interest amount and a minimum payment due. The account statement indicates the revolving credit line. The cardmember 10 is given a pre-defined grace period, such as twenty grace days, for payment, similar to a transactor on other transaction cards.

In the revolving credit card aspect 14, the transaction card 12 adopts the "pay in full" charge card feature 20 when the enrolled cardmember 10 either chooses to go above the revolving credit line assigned to the cardmember's account or balcons an amount that exceeds the revolving line of credit for the account. Once the cardmember 10 exceeds the revolving credit limit, all subsequent charges must be paid in full up to the no preset spending limit assigned, for example, by the financial institution. Any charge to the card 12 above the revolving credit line and the no preset spending limit assigned by the financial institution is declined. In essence, the cardmember 10 now has two balances due. One of the balances due is the cardmember-chosen revolving balance, and the other balance due is the full transaction balance incurred by the cardmember 10 as a result of continued usage of the transaction card 12 above the revolving credit limit.

Figure 2:
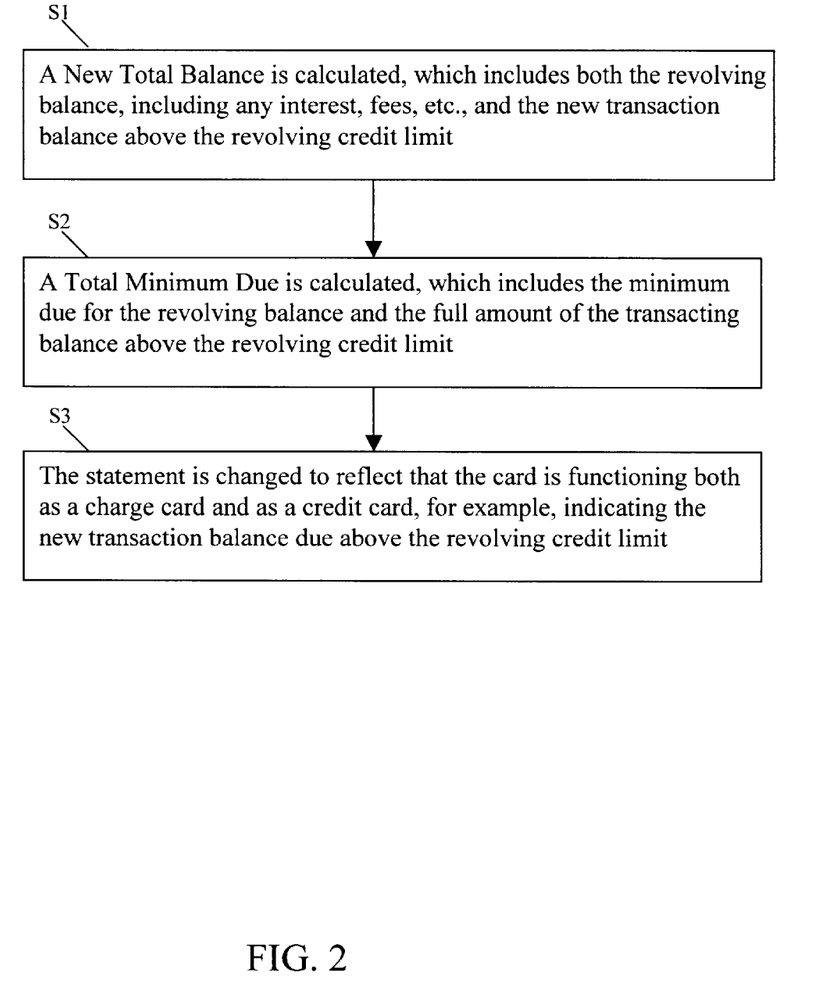
FIG. 2 is a flow chart which illustrates an example of the process of notifying the cardmember of the Total Minimum Due in the revolving credit card aspect for an embodiment of the present invention.

FIG. 2 is a flow chart which illustrates an example of the process of notifying the cardmember 10 of the Total Minimum Due in the revolving credit card aspect 14 for an embodiment of the present invention. Referring to FIG. 2, at S1, a New Total Balance is calculated, which includes both the revolving balance, including any interest, and the new transaction balance above the revolving credit limit. At S2, a Total Minimum Due is calculated, which includes the minimum due for the revolving balance and the full amount of the transacting balance above the revolving credit limit. At S3, the statement is changed to reflect that the card 12 is functioning both as a charge card 20 and as a credit card 18, for example, indicating the new transaction balance due above the revolving credit limit.

Figure 3:
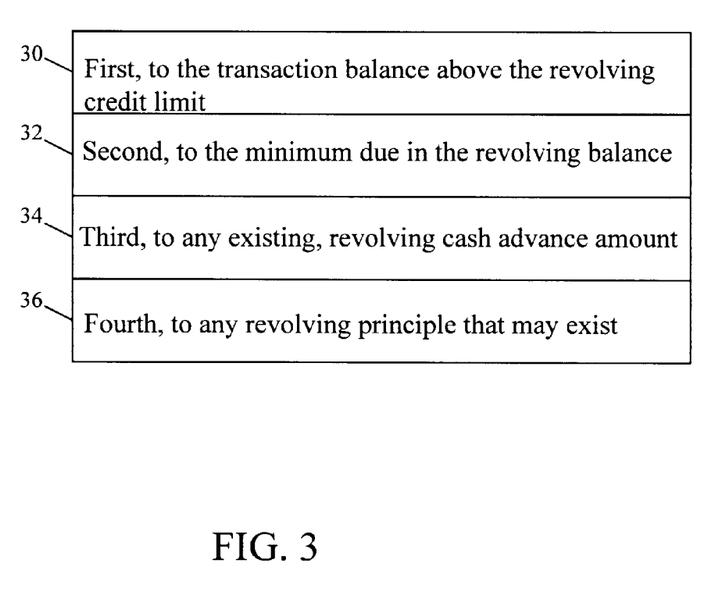
FIG. 3 is a table which shows an example of the payment hierarchy in the revolving card aspect for an embodiment of the present invention.

In the revolving card aspect 14 of the present invention, cash advances are treated as revolving credit and have the standard finance charge assessed from the day they are taken until payment is received. FIG. 3 is a table which shows an example of the payment hierarchy in the revolving card aspect 14 for an embodiment of the present invention. As shown in FIG. 3, the cardmember's payment is applied first to the transaction balance 30, then to the minimum due in the revolving balance 32, then to any existing, revolving cash advance amount 34, and then to any revolving principle that may exist 36. Once the cardmember 10 has paid his or her balance in full and begins transacting again, the cardmember 10 has the full revolving credit line available once more. A single statement for the cardmember 10 reflects both the transaction 20 and revolving 18 status.

Figure 4:
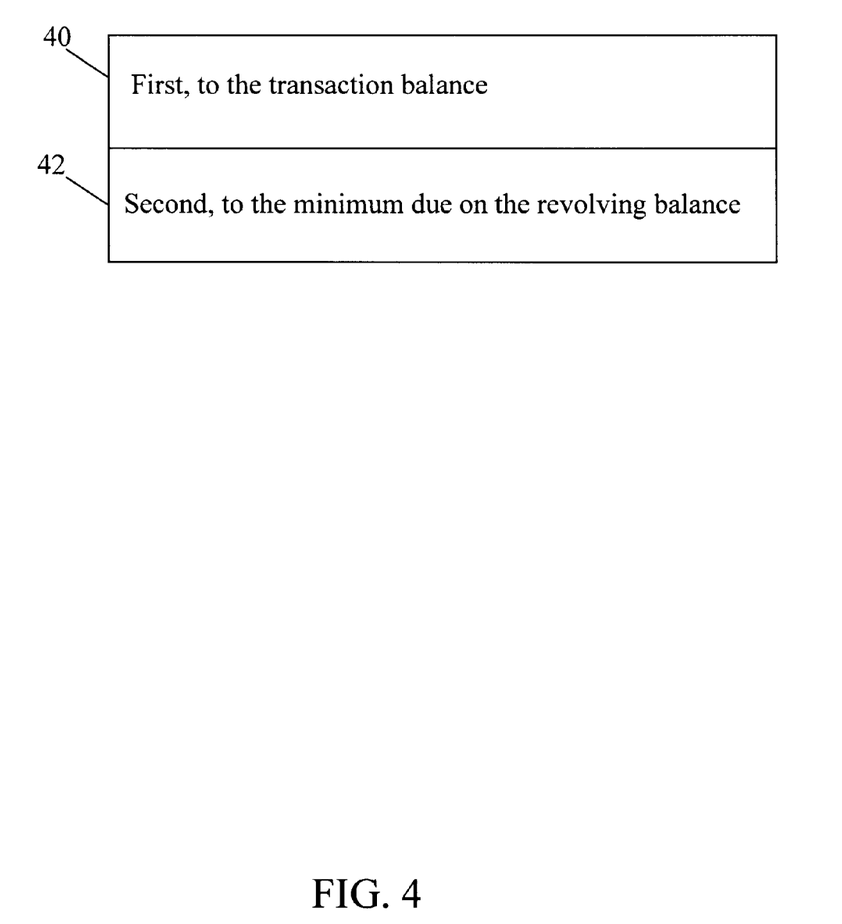
FIG. 4 is a table which illustrates an example of the payment hierarchy in the revolving card aspect for an embodiment of the present invention if the cardmember does not pay the Total Minimum Due.

FIG. 4 is a table which illustrates an example of the payment hierarchy in the revolving card aspect for an embodiment of the present invention if the cardmember 10 does not pay the Total Minimum Due. Referring to FIG. 4, should the cardmember 10 not pay his or her Total Minimum Due of the new transacting purchases balance above the revolving credit limit and the minimum due from the revolving balance, the cardmember's payment is applied first to the transaction balance 40 above the revolving credit limit. The remaining transacting balance above the revolving credit limit has a finance charge applied retroactively as if it had been part of the revolving balance as of the transaction date, and the unpaid transaction balance plus interest is added to the remaining revolving balance. At this point, the card can no longer be used until the amount above the revolving credit limit is paid off.

All fees are in line, for example, with the rest of the card issuer's business, such as cash advance fees, foreign transaction fees, late fees, bad check fee, and returned payment fee. There is, however, no over-the-credit-line fee for no-preset-spending accounts. Should the cardmember 10 make a partial payment indicating that he or she wants the remaining portion of the cardmember's balance to enter revolving status 18, no fee is charged for non-payment of the full balance, and the retroactive interest application serves to cover any late fee. If no payment is received by the grace day date, a late fee is assessed and reflected on the next month's statement. The cardmember 10 is informed by message statement on the next first statement after he or she becomes past due that his or her balance is past due. The cardmember 10 is reminded that he or she may lose card privileges if the minimum due, if in revolve mode 18, or the full balance due, if in transacting mode 20, is not paid in full.

If payment is still not received by the due date of the next month's statement, and on each successive month the account is delinquent, an additional late fee of a pre-determined amount is assessed and reflected on the next month's statement. The cardmember 10 is informed by message statement that his or her balance is past due and that if the cardmember 10 does not pay the balance in full, the cardmember's card privileges will be suspended. A DCF letter is generated to state that the account is past due and, if not paid in full, that all card privileges will be suspended. The cardmember 10 has a pre-determined number of grace days until his or her card privileges are suspended. Should the card issuer declare the account in default, the full balance is due immediately. A DCF letter and message statement notifies the cardmember 10 that his or her card privileges have been suspended. Should the cardmember 10 default, he or she is charged a punitive APR on the full balance due at the time of default.

Referring again to FIG. 1, in the pay-in-full aspect 16 of the present invention, the transaction card 12 has a dual function as a pay-in-full charge card 22 and revolving credit card 24. In the pay-in-full aspect 16, the transaction card 12 is issued and functions as a pay-in-full product 22. At the time the cardmember 10 chooses to revolve, the transaction card 12 functions as both a charge card 22 and a credit card 24. The cardmember 10 transacts each month, and a monthly statement is issued informing the cardmember 10 that either 1) the balance is due in full at the time of billing, or 2) the minimum due of the full balance is due at the time of billing. There is an APR and minimum due reflected should the cardmember elect to revolve any portion of the balance. Since, for example, the account is a no preset spending account, there is a revolving credit line and cash advance limit line indicated on the statement. The cardmember 10 is given a pre-determined number of grace days for payment, similar to a transactor on other transaction cards.

In the pay-in-full aspect 16 of an embodiment of the present invention, the transaction card 12 remains a pay-in-full product 16 until the cardmember 10 either chooses to make a partial payment of the cardmember's pay-in-full bill by the due date, chooses to take a cash advance, or chooses to balcon onto the account, should any of these functions be provided. The credit section of the card issuer specifies the maximum amount the cardmember 10 can revolve. Once the pay-in-full product 16 falls into the revolving category 24, it functions as a credit card only for those balances which the cardmember 10 chooses to revolve. All new monthly purchases from the last bill date are treated as if the cardmember 10 is still transacting and is included in the revolving balance. In essence, the cardmember 10 now has two balances due, known as the Total Balance. One balance is the cardmember-chosen full revolving balance(s), and the other balance is the full transaction balance incurred by the cardmember 10 as a result of continued usage of the card, which the card issuer may want to encourage.

Figure 5:
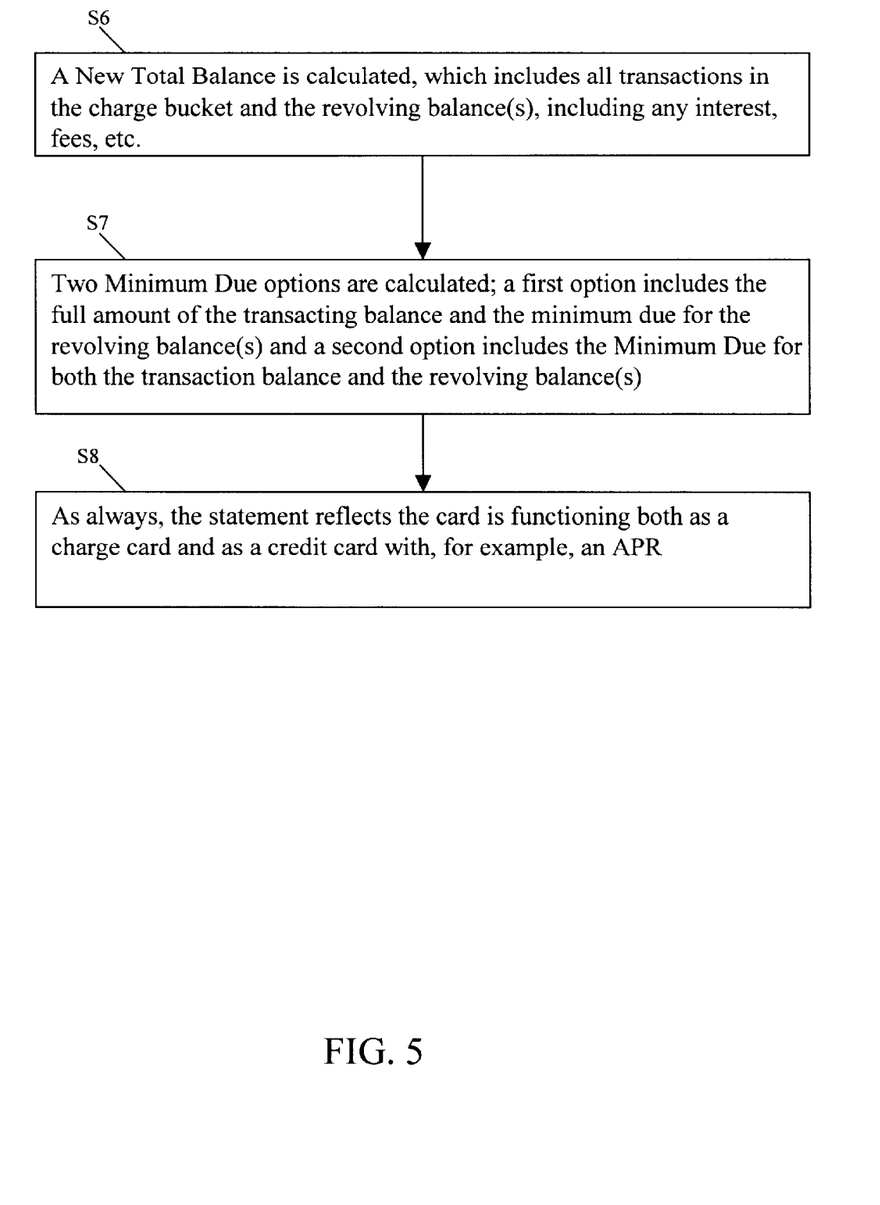
FIG. 5 is a flow chart which illustrates an example of the process of notifying the cardmember of the Minimum Due Option 1 and/or Minimum Due Option 2 in the pay-in-full aspect for an embodiment of the present invention.

FIG. 5 is a flow chart which illustrates an example of the process of notifying the cardmember 10 of the two minimum due calculations, Minimum Due Option 1 and/or Minimum Due Option 2, in the pay-in-full aspect for an embodiment of the present invention. Referring to FIG. 5, at S6, a New Total Balance is calculated, which includes both the new transaction balance and the revolving balance(s), including any interest, fees, etc. At S7, two Minimum Due options are calculated. A first option includes the full amount of the transaction balance and the minimum due for the revolving balance, and a second option includes the Minimum Due for both the transaction balance and the revolving balance(s). At S8, as always, the statement reflects the card is functioning both as a charge card and as a credit card with, for example, an APR.

Figure 6:
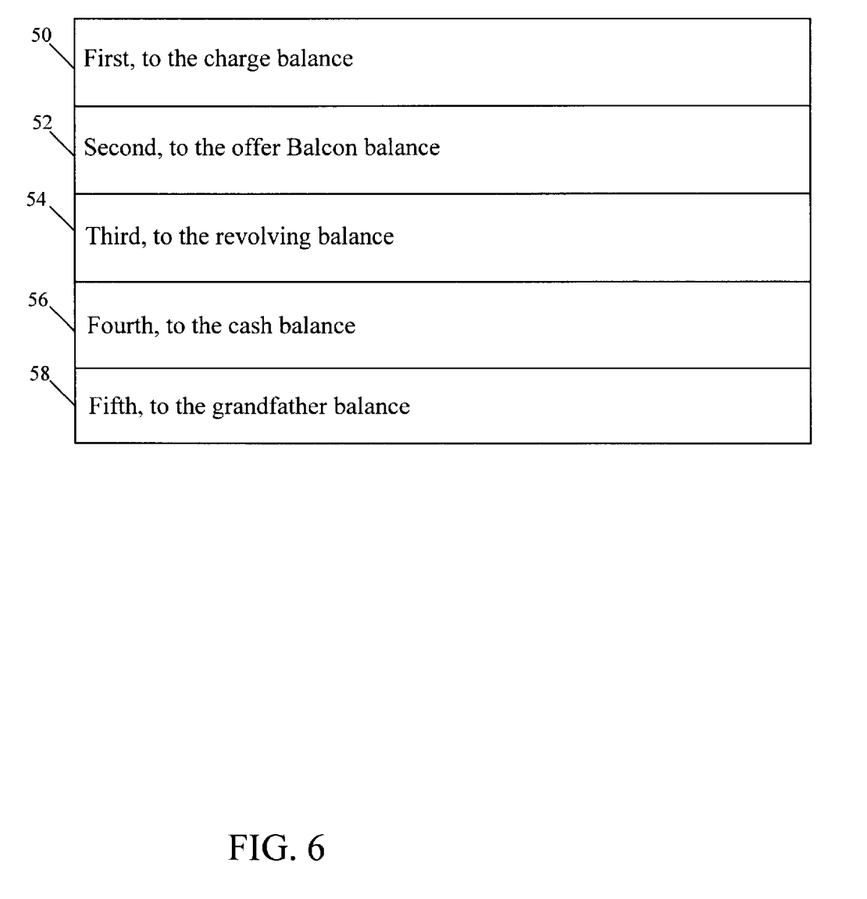
FIG. 6 is a table which shows an example of the payment hierarchy in the pay-in-full aspect for an embodiment of the present invention.
Figure 7:
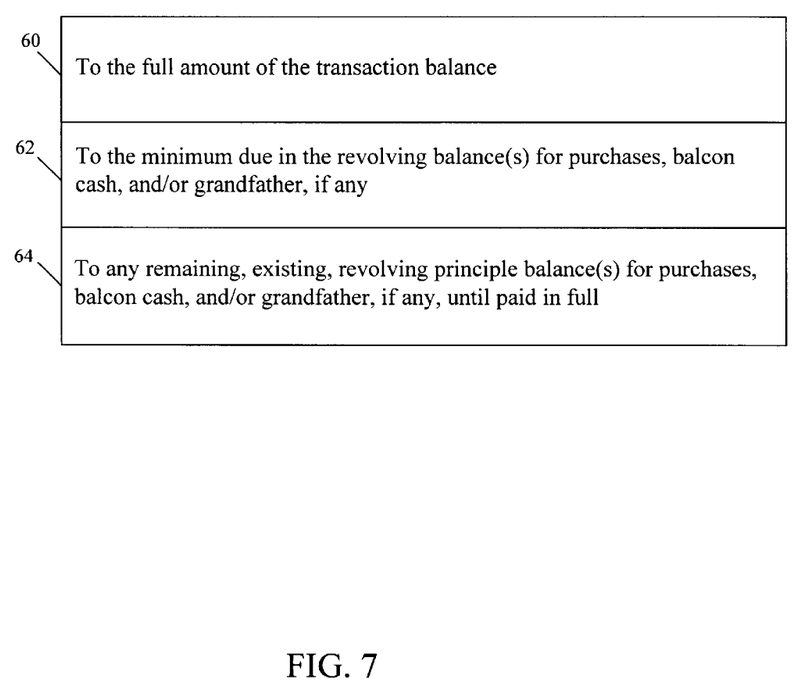
FIG. 7 is a table which shows an example of the manner in which the payment is assessed for the first Minimum Due option for an embodiment of the present invention.

In the pay-in-full aspect 16 for an embodiment of the present invention, cash advances are treated as revolving credit and have the standard finance charge assessed from the day they are taken until payment is received. FIG. 6 is a table which shows an example of the payment hierarchy in the pay-in-full aspect 16 for an embodiment of the present invention. As shown in FIG. 6, the cardmember's payment is applied first to the charge balance 50, then to the offer (balcon) balance 52, then to the revolving balance 54, then to the cash balance 56, and then to the grandfather balance 58. FIG. 7 is a table which shows an example of the manner in which the payment is assessed for the first Minimum Due option for an embodiment of the present invention. As shown in FIG. 7, the payment is assessed for the first option to the full amount of the transaction balance 60, to the minimum due in the revolving balance(s) for purchases, balcon, cash, and/or grandfather 62, if any, and to any remaining, existing, revolving principle balance(s) for purchases, balcon, cash, and/or grandfather 64, if any, until paid in full.

Figure 8:
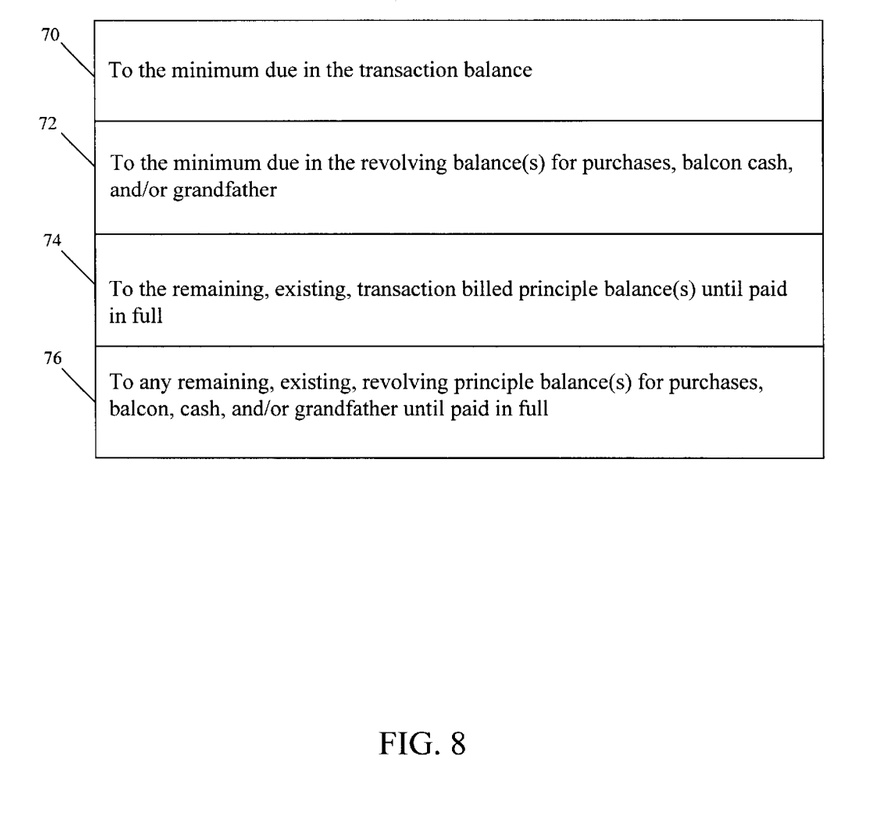
FIG. 8 is a table which shows an example of the manner in which the payment is assessed for the second Minimum Due option for an embodiment of the present invention.

Once the cardmember 10 pays his or her balance in full and begins transacting again in the pay-in-full aspect 16, the product reverts to a pay-in-full product 22. A single statement for the cardmember 10 reflects both a transaction 22 and revolving 24 status. FIG. 8 is a table which shows an example of the manner in which the payment is assessed for the second Minimum Due option for an embodiment of the present invention. As shown in FIG. 8, the payment is assessed for the second option to the minimum due in the transaction balance 70, to the minimum due in the revolving balance(s) for purchases, balcon, cash, and/or grandfather 72, if any, to the remaining, existing, transaction billed principle balances(s) 74, until paid in full, and to any remaining, existing, revolving principle balance(s) for purchases, balcon, cash, and/or grandfather 76, until paid in full.

All fees are in line, for example, with the rest of the card issuer's business, such as cash advance fees, foreign transaction fees, late fees, bad check fee, and returned payment fee. There is, however, no over-the-credit-line fee for no preset spending accounts. Should the cardmember 10 make a partial payment, such as at least the Minimum Due Option 2, indicating that he or she wants the remaining portion of the cardmember's balance to enter revolving status, there is no fee changed for non-payment of the full balance. The interest application serves to cover any late fee. If no payment is received by the grace day date, a late fee is assessed and reflected on the next month's statement. The cardmember 10 is informed by message statement on the next first statement after the cardmember 10 becomes past due that his or her balance is past due. The cardmember 10 is reminded that he or she may lose card privileges if the minimum due, if in revolve mode 24, or the fall balance, if in transacting mode 22, is not paid in full.

If payment is still not received by the due date of the next ($2^{nd}$) month's statement, and on each successive month the account is delinquent, an additional late fee is assessed and reflected on the next month's statement. This late fee is calculated by assessing either a dollar amount or a percentage of the delinquent balance, whichever is greater. The cardmember 10 is informed that his or her balance is past due and that if the cardmember 10 does not pay his or her balance in full the cardmember's card privileges will be suspended The cardmember 10 has a pre-determined number of grace days until card privileges are suspended. Should the cardmember 10 default, the cardmember 10 is charged a punitive APR on the full balance past due at the time of default and the past due balance is moved to the punitively priced revolving portion 24.

Figure 9:
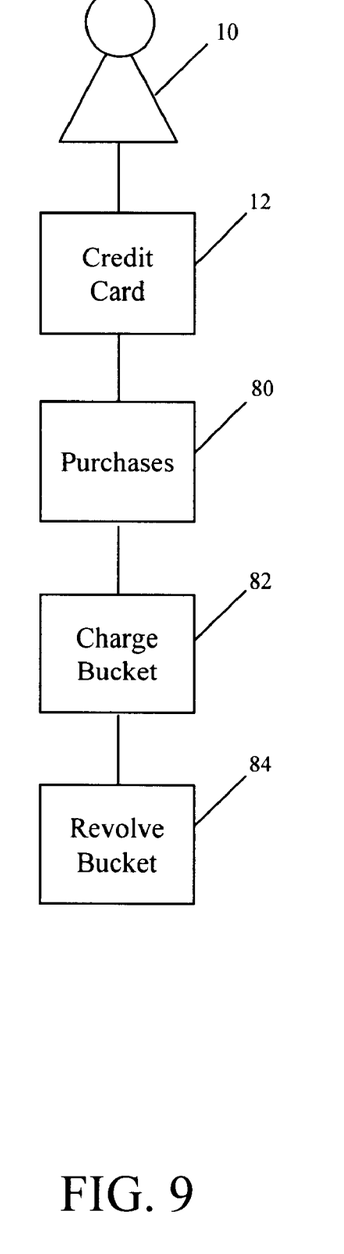
FIG. 9 is a chart which illustrates an example of the dual charge and revolve functionality for an embodiment of the present invention.

A key aspect of the credit card account for an embodiment of the present invention is the dual charge and revolve functionality. FIG. 9 is a chart which illustrates an example of the dual charge and revolve functionality for an embodiment of the present invention. A critical differentiator from any existing product is that all new purchases 80 that are new charges go into a charge section or segment of the account that can be referred to as the charge bucket 82.

Regardless of whether the cardmember 10 is revolving another balance in a revolve segment of the account that can be referred to as a revolve bucket 84, these new purchases 80 do not accrue interest. This is unlike any currently existing credit card and is a primary differentiator of the account for an embodiment of the present invention. From a consumer perspective, the consumer expects to pay off the charges that are in the charge bucket 82. If not paid, the remaining purchases 80 can also fall from the charge bucket 82 into the revolve bucket 84, on which the consumer is not paying off the balance but is being charged interest. With those two bucket definitions in mind, an embodiment of the present invention has, for example, the dual functionality in terms of the charge bucket 82 and the revolve bucket 84.

Assume, for example, that the cardmember 10 receives a new card for the account for an embodiment of the present invention. Initially, there are no charges in either of the two buckets. When the cardmember 10 makes purchases 80 with the card, for example, in the first month after receiving the card, the purchases 80 fall first into the charge bucket 82. At the end of the first billing cycle, for example, for the first month, the cardmember 10 receives a statement. As the cardmember 10 continues to use the card for purchases 80 in the second month after receiving the card, all of the charges for the first month remain in the charge bucket 82, and all new purchases 80 made in the second month fall into the charge bucket 82 as well. After the first billing cycle, when the cardmember 10 receives a statement at the end of the first billing cycle, the purchases 80 during the first billing cycle remain in the charge bucket 82, and there is no interest charged to the cardmember 10 on those purchases 80. Further, not only do the purchases 80 made during the first billing cycle remain in the charge bucket 82 at the end of the first billing cycle, but also all new purchases 80 made in the second billing cycle fall into the charge bucket 82 as well.

Continuing with the foregoing example, at the end of each billing cycle, the cardmember 10 has an option of either paying off the charge bucket 82 in full, which is included in the minimum due option one, or a minimum due option two of payment of a fraction (e.g., $1/48^{th}$) of the entire balance of the charge bucket 82. At the end of the first billing cycle, if the cardmember 10 pays the statement in full, all of the cardmember's current month's charges remain in the charge bucket 82, and the billing cycle starts again with new purchases 80 from the third month falling into the charge bucket 82, as well. No interest is accrued on the purchases 80 in the charge bucket 82. If the cardmember 10 chooses to pay, for example, the minimum due option two, all of the remaining purchases 80 for the first cycle (month) fall into the revolve bucket 84 and begin to accrue interest at the cycle date. Therefore, the cardmember 10 has a complete grace period from billing cycle to billing cycle. However, all of the new purchases 80 made after the first billing cycle during the second billing cycle fall into the charge bucket 82 and do not accrue interest. That is differentiated from currently available credit cards. On currently available credit cards, if the cardmember 10 does not pay in full but pays the minimum due instead, all new purchases begin to accrue interest, for example, as of the purchase date or minimum payment date or billing cycle date.

As an example of the non-interest grace period for an embodiment of the present invention, assume that the cardmember 10 receives the new card on January 1 and goes out and makes a $1,000 purchase 80 on January 2. Assume also that the cardmember's first account cycle ends January 25, at which time a statement goes out to the cardmember 10 for which payment is not due until February 25. In essence, the cardmember 10 has two billing cycles of grace period on the $1,000 amount of the purchase 80, and that situation continues from cycle to cycle. A primary distinction between the credit card account for an embodiment of the present invention and a currently available credit card product is that the present invention allows the cardmember 10 to carry a balance from month to month and at the same time to retain that grace period for new purchases 80.

In a currently available credit card, if a cardmember 10 elects an option for balance consolidation (balcon) in applying for a credit card, all new purchases are transferred immediately into the revolving bucket. Thus, all new purchases begin to accrue interest as of the day they are made, and there is no charge bucket. Instead, they fall directly into the revolving bucket. However, in the card account for an embodiment of the present invention, if a cardmember 10 elects an option for balcon in applying for the present invention, all new purchases 80 go into the charge bucket 82 and do not earn interest. Further, with regard to a cash advance, when the cardmember 10 applies for and receives a currently available credit card and uses it for a cash advance at an ATM, the cash advance falls immediately into the revolving bucket and begins to accrue interest, and all new charges fall into the revolving bucket and begin to accrue interest. However, with regard to a cash advance, when the cardmember 10 applies for and receives a card account for an embodiment of the present invention and uses it for a cash advance at an ATM, the cash advance falls immediately into the revolving bucket and begins to accrue interest, while all new charges fall into the charge bucket 82 and do not accrue interest.

Features of the credit card account for an embodiment of the present invention include, for example, a no preset spending limit associated with the charge bucket 82. Typically, a no preset spending limit allows the cardmember 10 to choose to spend each month as much as the cardmember 10 wishes, subject to certain limitations listed below. The no preset spending limit is distinguished, for example, from a credit line, which sets a maximum amount, above which the cardmember 10 is subject to fees. In addition, an embodiment of the present invention makes use of a revolving credit line associated with the revolve bucket 84. The cardmember 10 can spend above the revolving credit line but must pay off any amount above the revolving credit line in full each month to remain in good standing. The revolving credit line is also the most the cardmember may revolve from month to month. Limitations once the cardmember 10 goes above the revolving credit line can include, for example, a review of the account by the card issuer, which can, for example, approve the purchase 10 over the revolving credit line on the spot, or place the purchase 10 over the revolving credit line in review for approval and an increase in the revolving credit line, or deny the purchase 10 over the revolving credit line.

The no preset spending limit is associated with the charge bucket 82, and the revolving credit line is associated with the revolve bucket 84, above which the cardmember 10 cannot revolve. An embodiment of the present invention combines aspects of charge and revolve into a single product. In characterizing the functionality of the charge bucket 82 and the revolve bucket 84, there are certain other features that are associated with those particular buckets and how they function. The no preset spending limit is an aspect of the charge bucket 82 that is attractive to consumers, and the revolving credit line is an aspect associated with the revolve bucket 84. For example, if the cardmember 10 has a revolving credit line of $5,000 and already has $5,000 in the revolve bucket 84, the cardmember 10 can continue to make new purchases 80 into the no preset spending limit charge bucket 82, but must pay those purchases in the charge bucket 82 in full at the end of the bill cycle, because for all amounts over the revolving credit line requirement of payment in full is applied.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for managing a transaction card account, comprising:
    issuing a dual function transaction card with primary and secondary transaction card functions to a cardmember in connection with the account;
    allowing the cardmember to incur charges on the account with the dual function transaction card;
    periodically issuing a statement to the cardmember on the account for a balance payable based on the primary function of the transaction card;
    allowing the cardmember to elect the secondary function of the dual function transaction card; and
    computing a new balance on the account in response to the election of the secondary function by the cardmember.

2. The method of claim 1, wherein issuing the dual function transaction card further comprises issuing a dual function transaction card with a revolving credit card primary function and a pay-in-full charge card secondary function.

3. The method of claim 2, wherein issuing the dual function transaction card further comprises issuing the dual function transaction card with the revolving credit card primary function and the pay-in-full charge card secondary function which allows the cardmember to revolve up to a predetermined credit limit balance and to pay in full a balance above the predetermined revolving credit limit balance.

4. The method of claim 3, wherein issuing the dual function transaction card further comprises issuing the dual function transaction card with the revolving credit card primary function and the pay-in-full charge card secondary function which functions both as a pay-in-full charge card and a revolving credit card, if the cardmember chooses to pay a revolving credit card balance in full.

5. The method of claim 1, wherein issuing the dual function transaction card further comprises issuing a dual function transaction card with a pay-in-full charge card primary function and a revolving credit card secondary function.

6. The method of claim 5, wherein issuing the dual function transaction card further comprises issuing the dual function transaction card with the pay-in-full charge card primary function and the revolving credit card secondary function which allows the cardmember to revolve a portion of a pay-in-full charge card balance.

7. The method of claim 6, wherein issuing the dual function transaction card further comprises issuing the dual function transaction card with the pay-in-full charge card primary function and the revolving credit card secondary function which function both as a pay-in-full charge card and a revolving credit card, if the cardmember chooses to revolve any portion of an unpaid balance pay-in-full charge card balance.

8. The method of claim 1, wherein allowing the cardmember to incur charges on the account further comprises allowing the cardmember to incur charges for a cash advance on the account for the dual function transaction card.

9. The method of claim 8, wherein allowing the cardmember to incur charges for the cash advance on the account further comprises allowing the cardmember to incur charges on the account for the dual function transaction card with a revolving credit card primary function and a pay-in-full charge card secondary function.

10. The method of claim 9, wherein allowing the cardmember to incur charges for the cash advance on the account for the dual function transaction card with the revolving credit card primary function and the pay-in-full charge card secondary function further comprises treating the cash advance as revolving credit with a finance charge assessed from the day of the advance until payment is received.

11. The method of claim 8, wherein allowing the cardmember to incur charges for a cash advance on the account for the dual function transaction card further comprises allowing the cardmember to incur charges on the account for the dual function transaction card with a pay-in-full charge card primary function and a revolving credit card secondary function.

12. The method of claim 11, wherein allowing the cardmember to incur charges for the cash advance on the account for the dual function transaction card with the pay-in-full charge card primary function and the revolving credit card secondary function further comprises treating the cash advance as revolving credit with a finance charge assessed from the day of the advance until payment is received.

13. The method of claim 1, wherein issuing the statement based on the primary function of the dual function transaction card further comprises issuing the statement based on the primary function of the transaction card as a revolving credit transaction card.

14. The method of claim 13, wherein issuing the statement based on the primary function of the transaction card as a revolving credit transaction card further comprises issuing the statement informing the cardmember of a balance that can be revolved and a balance above a pre-defined revolving credit limit that must be paid in full.

15. The method of claim 14, wherein issuing the statement based on the primary function of the transaction card as a revolving credit transaction card further comprises issuing the statement informing the cardmember of a minimum payment due and a revolving credit line amount.

16. The method of claim 15, issuing the statement based on the primary function of the transaction card as a revolving credit transaction card further comprises providing the cardmember a predetermined number of grace days for payment of the statement.

17. The method of claim 1, wherein issuing the statement based on the primary function of the dual function transaction card further comprises issuing the statement based on the primary function of the transaction card as a pay-in-full transaction card.

18. The method of claim 17, wherein issuing the statement based on the primary function of the transaction card as a pay-in-full transaction card further comprises issuing the statement informing the cardmember of a balance that is due in full.

19. The method of claim 18 wherein issuing the statement based on the primary function of the transaction card as a pay-in-full transaction card further comprises providing the cardmember a predetermined number of grace days for payment of the statement and a total balance including both a charge balance and a revolving balance, and also includes a minimum due for options for one of payment of the charge balance in full with a portion of the revolving balance and payment of a portion of the total balance with an election to cause an unpaid portion of the charge balance to move into the revolving balance.

20. The method of claim 1, wherein allowing the cardmember to elect the secondary function of the dual function transaction card further comprises allowing the cardmember to elect a pay-in-full charge card secondary function of the dual function transaction card having a revolving credit transaction card primary function.

21. The method of claim 20, wherein allowing the cardmember to elect the pay-in-full charge card secondary function of the dual function transaction card further comprises allowing the cardmember to elect the pay-in-full charge card secondary function of the dual function transaction card by exceeding a revolving credit line assigned to the transaction card account.

22. The method of claim 20, wherein allowing the cardmember to elect the pay-in-full charge card secondary function of the dual function transaction card further comprises allowing the cardmember to elect the pay-in-full charge card secondary function of the dual function revolving credit transaction card by balconning an amount that exceeds a revolving credit line assigned to the transaction card account.

23. The method of claim 20, wherein allowing the cardmember to elect the pay-in-full charge card secondary function of the dual function transaction card further comprises requiring the cardmember who exceeds a revolving credit line assigned to the transaction card account to pay-in-full a balance by which the revolving credit line is exceeded.

24. The method of claim 20, wherein allowing the cardmember to elect the pay-in-full charge card secondary function of the dual function transaction card further comprises one of approving, reviewing for approval by telephone at a point of sale, and declining, any charge by the cardmember that exceeds a revolving credit line assigned to the transaction card account, depending at least in part on one of an amount of the charge, a credit history of the cardmember, and a length of time that the cardmember has been a cardmember.

25. The method of claim 1, wherein allowing the cardmember to elect the secondary function of the dual function transaction card further comprises allowing the cardmember to elect a revolving credit transaction card secondary function of the dual function transaction card having a pay-in-full transaction card primary function.

26. The method of claim 25, wherein allowing the cardmember to elect the revolving credit card secondary function of the dual function transaction card further comprises allowing the cardmember to elect the revolving credit card secondary function of the dual function transaction card by choosing to make a partial payment of a pay-in-full balance due.

27. The method of claim 25, wherein allowing the cardmember to elect the revolving credit card secondary function of the dual function transaction card further comprises allowing the cardmember to elect the revolving credit card secondary function of the dual function transaction card by taking a cash advance.

28. The method of claim 25, wherein allowing the cardmember to elect the revolving credit card secondary function of the dual function transaction card further comprises allowing the cardmember to elect the revolving credit card secondary function of the dual function transaction card by accepting a balance consolidation onto the transaction card account.

29. The method of claim 25, wherein allowing the cardmember to elect the revolving credit card secondary function of the dual function transaction card further comprises establishing a maximum amount revolving credit limit that the cardmember is allowed to revolve.

30. The method of claim 25, wherein allowing the cardmember to elect the revolving credit card secondary function of the dual function transaction card further comprises allowing the dual function transaction card to function as a revolving credit card for balances which the cardmember chooses to revolve.

31. The method of claim 1, wherein computing the new balance further comprises computing the new balance with respect to the dual function transaction card in response to the election of a pay-in-full charge card secondary function of the dual function transaction card having a revolving credit card primary function by the cardmember.

32. The method of claim 31, wherein computing the new balance in response to the election of the pay-in-full charge card secondary function by the cardmember further comprises computing a new total balance consisting of at least a cardmember-chosen revolving balance and a full transaction balance incurred by the cardmember as a result of continued usage of the transaction card.

33. The method of claim 32, wherein computing the new balance in response to the election of the pay-in-full charge card secondary function by the cardmember further comprises computing a total minimum due consisting of at least a minimum due for the revolving balance and the full amount of the transaction balance.

34. The method of claim 1, wherein computing the new balance further comprises computing the new balance with respect to the dual function transaction card in response to the election of a revolving credit card secondary function of the dual function transaction card having a pay-in-full charge card primary function by the cardmember.

35. The method of claim 34, wherein computing the new balance in response to the election of the revolving credit card secondary function by the cardmember further comprises computing a new total balance consisting of at least a cardmember-chosen revolving balance and a full transaction balance incurred by the cardmember as a result of continued usage of the transaction card.

36. The method of claim 35, wherein computing the new balance in response to the election of the revolving credit card secondary function by the cardmember further comprises computing a first minimum due option consisting of at least a minimum due for the revolving balance and the full amount of the transaction balance and a second minimum due option consisting of at least a minimum due for the revolving balance and a minimum due for the transaction balance.

37. A system for managing a transaction card account, comprising:
   means for issuing a dual function transaction card with primary and secondary transaction card functions and a no preset spending limit to a cardmember in connection with the account;
   means for allowing the cardmember to incur charges on the account with the dual function transaction card;
   means for periodically issuing a statement to the cardmember on the account for a balance payable based on the primary function of the transaction card;

means for allowing the cardmember to elect the secondary function of the dual function transaction card; and means for computing a new balance on the account in response to the election of the secondary function by the cardmember.

38. The system of claim 37, wherein the means for issuing the dual function transaction card further comprises means for issuing a dual function revolving credit transaction card with a revolving credit card primary function and a pay-in-full charge card secondary function.

39. The system of claim 38, wherein the means for issuing the dual function revolving credit transaction card further comprises means for issuing the dual function revolving transaction card with the revolving credit card primary function and the pay-in-full charge card secondary function which allows the cardmember to revolve up to a predetermined credit limit balance and to pay in full a balance above the predetermined revolving credit limit balance.

40. The system of claim 39, wherein the means for issuing the dual function revolving credit transaction card further comprises means for issuing the dual function revolving transaction card with the revolving credit card primary function and the pay-in-full charge card secondary function which functions both as a pay-in-full charge card and a revolving credit card, if the cardmember chooses to pay a revolving credit card balance in full.

41. The system of claim 37, wherein the means for issuing the dual function transaction card further comprises means for issuing a dual function pay-in-full transaction card with a pay-in-full charge card primary function and a revolving credit card secondary function.

42. The system of claim 41, wherein the means for issuing the dual function pay-in-full transaction card further comprises means for issuing the dual function pay-in-full transaction card with the pay-in-full charge card primary function and the revolving credit card secondary function which allows the cardmember to revolve a portion of -in-full charge card balance.

43. The system of claim 42, wherein the means for issuing the dual function pay-in-full transaction card further comprises means for issuing the dual function pay-in-full transaction card with the pay-in-full charge card primary function and the revolving credit card secondary function which function both as a pay-in-full charge card and a revolving credit card, if the cardmember chooses to revolve any portion of an unpaid balance pay-in-full charge card balance.

44. The system of claim 37, wherein the means for allowing the cardmember to incur charges on the account further comprises means for allowing the cardmember to incur charges on the account for the dual function transaction card for a cash advance.

45. The system of claim 44, wherein the means for allowing the cardmember to incur charges on the account further comprises means for allowing the cardmember to incur charges on the account for a dual function revolving credit transaction card for a cash advance.

46. The system of claim 45, wherein the means for allowing the cardmember to incur charges on the account for the dual function revolving credit transaction card for a cash advance further comprises means for treating the cash advance as revolving credit with a finance charge assessed from the day of the advance until payment is received.

47. The system of claim 44, wherein the means for allowing the cardmember to incur charges on the account for the dual function transaction card further comprises means for allowing the cardmember to incur charges on the account for a dual function pay-in-full charge card for the cash advance.

48. The system of claim 47, wherein the means for allowing the cardmember to incur charges on the account for the dual function pay-in-full charge card for the cash advance further comprises means for treating the cash advances as revolving credit with a finance charge assessed from the day of the advance until payment is received.

49. The system of claim 37, wherein the means for issuing the statement based on the primary function of the dual function transaction card further comprises means for issuing the statement based on the primary function of the transaction card as a revolving credit transaction card.

50. The system of claim 49, wherein the means for issuing the statement based on the primary function of the transaction card as a revolving credit transaction card further comprises means for issuing the statement informing the cardmember of a balance that can be revolved and a balance above a pre-defined revolving credit limit that must be paid in full.

51. The system of claim 50, wherein the means for issuing the statement based on the primary function of the transaction card as a revolving credit transaction card further comprises means for issuing the statement informing the cardmember of a minimum payment due and a revolving credit line amount.

52. The system of claim 51, issuing the statement based on the primary function of the transaction card as a revolving credit transaction card further comprises means for providing the cardmember a predetermined number of grace days for payment of the statement.

53. The system of claim 37, wherein the means for issuing the statement based on the primary function of the dual function transaction card further comprises means for issuing the statement based on the primary function of the transaction card as a pay-in-full transaction card.

54. The system of claim 53, wherein the means for issuing the statement based on the primary function of the transaction card as a pay-in-full transaction card further comprises means for issuing the statement informing the cardmember of a balance that is due in full.

55. The system of claim 53, wherein the means for issuing the statement based on the primary function of the transaction card as a pay-in-full transaction card further comprises means for providing the cardmember a predetermined number of grace days for payment of the statement and a total balance including both a charge balance and a revolving balance, and also includes a minimum due for options for one of payment of the charge balance in full with a portion of the revolving balance and payment of a portion of the total balance with an election to cause an unpaid portion of the charge balance to move into the revolving balance.

56. The system of claim 37, wherein the means for allowing the cardmember to elect the secondary function of the dual function transaction card further comprises means for allowing the cardmember to elect a pay-in-full charge card secondary function of the dual function transaction card having a revolving credit transaction card primary function.

57. The system of claim 56, wherein the means for allowing the cardmember to elect the pay-in-full charge card secondary function of the dual function transaction card further comprises means for allowing the cardmember to elect the pay-in-full charge card secondary function of the dual function transaction card by exceeding a revolving credit line assigned to the transaction card account.

58. The system of claim 56, wherein the means for allowing the cardmember to elect the pay-in-full charge card secondary function of the dual function transaction card further comprises means for allowing the cardmember to elect the pay-in-full charge card secondary function of the dual function revolving credit transaction card by balconning an amount that exceeds a revolving credit line assigned to the transaction card account.

59. The system of claim 56, wherein the means for allowing the cardmember to elect the pay-in-full charge card secondary function of the dual function transaction card further comprises means for requiring the cardmember who exceeds a revolving credit line assigned to the transaction card account to pay-in-full a balance by which the revolving credit line is exceeded.

60. The system of claim 56, wherein the means for allowing the cardmember to elect the pay-in-full charge card secondary function of the dual function transaction card further comprises means for one of approving, reviewing for approval by telephone at a point of sale, and declining, any charge by the cardmember that exceeds a revolving credit line assigned to the transaction card account, depending at least in part on one of an amount of the charge, a credit history of the cardmember, and a length of time that the cardmember has been a crewmember.

61. The system of claim 37, wherein the means for allowing the cardmember to elect the secondary function of the dual function transaction card further comprises means for allowing the cardmember to elect a revolving credit transaction card secondary function of the dual function transaction card having a pay-in-full transaction card primary function.

62. The system of claim 61, wherein the means for allowing the cardmember to elect the revolving credit card secondary function of the dual function transaction card further comprises means for allowing the cardmember to elect the revolving credit card secondary function of the dual function transaction card by choosing to make a partial payment of a pay-in-full balance due.

63. The system of claim 61, wherein the means for allowing the cardmember to elect the revolving credit card secondary function of the dual function transaction card further comprises means for allowing the cardmember to elect the revolving credit card secondary function of the dual function transaction card by taking a cash advance.

64. The system of claim 61, wherein the means for allowing the cardmember to elect the revolving credit card secondary function of the dual function transaction card further comprises means for allowing the cardmember to elect the revolving credit card secondary function of the dual function transaction card by accepting a balance consolidation onto the transaction card account.

65. The system of claim 61, wherein the means for allowing the cardmember to elect the revolving credit card secondary function of the dual function transaction card further comprises means for establishing a maximum amount revolving credit limit that the cardmember is allowed to revolve.

66. The system of claim 61, wherein the means for allowing the cardmember to elect the revolving credit card secondary function of the dual function transaction card further comprises means for allowing the dual function transaction card to function as a revolving credit card only for balances which the cardmember chooses to revolve.

67. The system of claim 37, wherein the means for computing the new balance further comprises means for computing the new balance with respect to the dual function transaction card in response to the election of a pay-in-full charge card secondary function of the dual function transaction card having a revolving credit card primary function by the cardmember.

68. The system of claim 67, wherein the means for computing the new balance in response to the election of the pay-in-full charge card secondary function by the cardmember further comprises means for computing a new total balance consisting of at least a cardmember-chosen revolving balance and a full transaction balance incurred by the cardmember as a result of continued usage of the transaction card.

69. The system of claim 68, wherein the means for computing the new balance in response to the election of the pay-in-full charge card secondary function by the cardmember further comprises means for computing a total minimum due consisting of at least a minimum due for the revolving balance and the full amount of the transaction balance.

70. The system of claim 37, wherein the means for computing the new balance further comprises means for computing the new balance with respect to the dual function transaction card in response to the election of a revolving credit card secondary function of the dual function transaction card having a pay-in-full charge card primary function by the cardmember.

71. The system of claim 70, wherein the means for computing the new balance in response to the election of the revolving credit card secondary function by the cardmember further comprises means for computing a new total balance consisting of at least a cardmember-chosen revolving balance and a full transaction balance incurred by the cardmember as a result of continued usage of the transaction card.

72. The system of claim 71, wherein the means for computing the new balance in response to the election of the revolving credit card secondary function by the cardmember further comprises means for computing a first minimum due option consisting of at least a minimum due for the revolving balance and the full amount of the transaction balance and a second minimum due option consisting of at least a minimum due for the revolving balance and a minimum due for the transaction balance.

73. A method for managing a transaction card account, comprising:
  issuing a dual function transaction card with a charge bucket function and a revolve bucket function to a cardmember in connection with the account;
  allowing the cardmember to incur charges on the account with the dual function transaction card which fall into the charge bucket for which no interest accrues;
  issuing a statement to the cardmember on the account for a balance payable on the charges in the charge bucket; and
  if the balance on the charges in the charge bucket is not fully paid, causing any remaining unpaid balance to fall from the charge bucket into the revolve bucket on which interest accrues.

74. A method for managing a transaction card account, comprising:
  issuing a dual function transaction card with a charge bucket function and a revolve bucket function to a cardmember in connection with the account;
  allowing the cardmember to incur new charges on the account by making purchases with the dual function transaction card in a billing cycle which fall into the charge bucket on which no interest accrues;
  issuing a statement to the cardmember on the account at the end of the billing cycle for the billing cycle for a balance payable on the charges in the charge bucket, which are allowed to remain in the charge bucket on which no interest accrues;

allowing the cardmember to continue using the card for new purchases in a succeeding billing cycle which also fall into the charge bucket on which no interest accrues;

at the end of each billing cycle, allowing the cardmember one of a first minimum due option of paying off the charges in the charge bucket in full and a second minimum due option of payment of a predetermined fraction of the entire balance of the charges in the charge bucket;

if the cardmember pays off the charges in the charge bucket in full at the end of the billing cycle according to the first minimum due option, allowing all current charges made by the cardmember to remain in the charge bucket, and causing all charges for new purchases made in a second succeeding billing cycle to fall into the charge bucket on which no interest accrues, as well; and if the cardmember pays the predetermined fraction of the entire balance of the charges in the charge bucket at the end of the billing cycle according to the second minimum due option, causing all of the unpaid charges for purchases for the billing cycle to fall into the revolve bucket on which interest accrues.

75. The method of claim 74, wherein issuing the dual function transaction card further comprises issuing the dual function transaction card to the cardmember with election by the cardmember of an option for balance consolidation in which charges for all new purchases fall into the charge bucket on which no interest accrues.

76. The method of claim 74, wherein issuing the dual function transaction card further comprises issuing the dual function transaction card to the cardmember with the charge bucket function having an associated no preset spending limit feature and the revolve bucket function having an associated revolving credit line to a cardmember in connection with the account.

77. The method of claim 74, wherein allowing the cardmember to incur new charges on the account further comprises allowing the cardmember to incur new charges on the account by using the transaction card for a cash advance at an ATM which falls immediately into the revolving bucket and begins to accrue interest, while continuing to allow charges for all new purchases to fall into the charge bucket on which no interest accrues.

78. A method for managing a transaction card account, comprising:

issuing a dual function transaction card for the account to a cardmember that initially functions as a revolving credit card with no preset spending limit which allows the cardmember to revolve an account balance up to a predetermined revolving credit line and requires the cardmember to pay in full any account balance in excess of the revolving credit line;

allowing the cardmember to incur charges on the account with the dual function transaction card;

issuing a statement informing the cardmember of an account balance for the revolving credit line and any account balance in excess of the revolving credit line that must be paid in full;

allowing the cardmember a first option to pay in full the account balance for the revolving credit line and any account balance in excess of the revolving credit line and a second option to accrue charges on the account in excess of the revolving credit line by one of incurring charges on the account in excess of the revolving credit line or consolidating a balance in excess of the revolving credit line;

if the cardmember elects the second option, converting the account for the card to function both as a charge card and a credit card; and issuing a succeeding statement informing the cardmember of the conversion and providing an account balance consisting of a cardmember selected revolving balance and a new transaction balance in excess of the revolving credit line.

79. A method for managing a transaction card account, comprising:

issuing a dual function transaction card for the account to a cardmember that initially functions as a pay-in-full charge card with an option to convert the dual function transaction card to additionally function as a revolving credit card;

allowing the cardmember to incur charges on the account with the dual function transaction card;

issuing a statement informing the cardmember of a pay-in-full charge card account balance and a minimum payment due amount;

allowing the cardmember a first option to pay in full the account balance for the pay-in-full charge card account balance and a second option to make a partial payment of the pay-in-full account balance and to revolve charges in excess of the partial payment;

if the cardmember elects the second option, converting the account for the card to function both as a charge card and as a credit card with respect to charges which the cardmember chooses to revolve; and issuing a succeeding statement informing the cardmember of the conversion and providing an account balance consisting of a cardmember-selected revolving balance and a transaction balance incurred by the cardmember as a result of continued usage of the dual function transaction card by the cardmember.

* * * * *